United States Patent [15] 3,674,712

Wilson [45] July 4, 1972

[54] PHOTOCONDUCTIVE DETECTOR MATERIAL

[72] Inventor: Oran W. Wilson, Richardson, Tex.

[73] Assignee: Texas Instruments Incorporated, Dallas, Tex.

[22] Filed: Oct. 23, 1968

[21] Appl. No.: 770,897

Related U.S. Application Data

[63] Continuation of Ser. No. 672,399, Oct. 2, 1968, abandoned, which is a continuation of Ser. No. 347,905, Feb. 27, 1964, abandoned.

[52] U.S. Cl. ..................................252/501, 96/1.5, 148/1.6, 148/173, 250/83.3 H, 252/62.3 E, 252/512

[51] Int. Cl. ......................H01b 1/02, H01l 3/00, H01l 13/00

[58] Field of Search ..................252/501, 512, 62.3 E; 96/1.5

[56] References Cited

UNITED STATES PATENTS 2,844,737 7/1958 Hahn et al. ............................250/211

*Primary Examiner*—Richard D. Lovering
*Attorney*—Samuel M. Mims, Jr., James O. Dixon, Andrew M. Hassell, Harold Levine, D. Carl Richards, William D. Harris, Jr. and E. Mickey Hubbard

[57] ABSTRACT

A photoconductive infrared detector for operation at liquid neon temperatures is disclosed which comprises a semiconductor material consisting essentially of a single crystal of germanium having copper and Group III shallow acceptor impurities which are compensated with arsenic or antimony at a level about one order of magnitude greater than the level of said shallow acceptor impurities, said single crystal of germanium being doped with mercury, the mercury atoms being present to a level in excess of the arsenic or antimony atoms.

14 Claims, 1 Drawing Figure

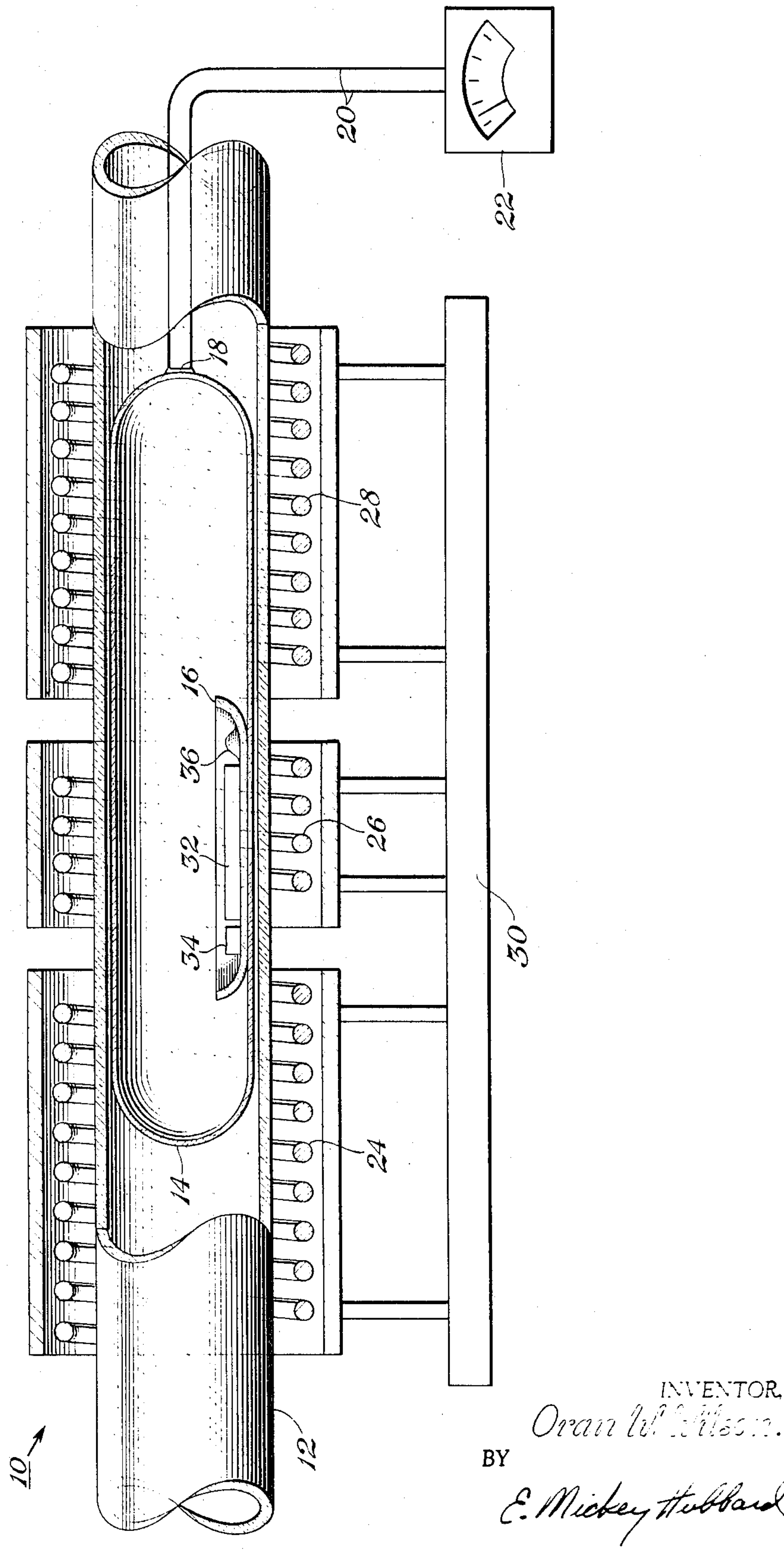
INVENTOR.
Oran W. Wilson
BY
E. Mickey Hubbard

PHOTOCONDUCTIVE DETECTOR MATERIAL

This application is a continuation of copending application Ser. No. 672,399, filed Oct. 2, 1968 (now abandoned), which was a continuation of copending application Ser. No. 347,905, filed Feb. 27, 1964 (now abandoned).

The present invention relates to photoconductive infrared detectors, and more particularly, but not by way of limitation, relates to a process for manufacturing mercury-doped germanium having a relatively short time-constant at temperatures which can be obtained by liquid neon, and to the semiconductor material resulting from the process.

Mercury-doped germanium has been suggested for use as an infrared detector material in various airborne all-weather mapping and surveillance devices. However, the mercury-doped germanium presently available must be maintained at very low temperatures in order to function as an infrared detector. The theoretical maximum temperature at which the mercury-doped germanium can be used for this purpose is 40° K, but nearly all previous applications have been at very low temperatures, for example in the liquid helium range (about 4° K). Since liquid helium is extremely difficult to handle in any circumstance, and in particular does not readily lend itself to airborne applications, attempts have been made to use mercury-doped germanium at liquid neon temperatures in the range of 27°–32° K because liquid neon is much easier to handle. But at these higher temperatures, mercury-doped germanium semiconductor materials heretofore available exhibit a long time-constant, and in particular, a long decay period. In other words, if the detector material is subjected to a square infrared pulse, the resulting conductivity of the material is not a square wave as required, but has an unacceptably long decay tail. For most applications, the detector material must have a time-constant of less than one micro-second. I have discovered that the long time-constant is caused by relatively high concentrations of copper and other shallow acceptors of Group III which are nearly always present in chemically-refined germanium. Copper, in particular, very readily diffuses into and contaminates liquids or solids, particularly at higher temperatures. Although small in quantity, the copper impurities diffusing into the mercury-doped germanium during its manufacture, even the small quantities which may be traced back to the extrusion dies used to make parts of the doping apparatus, are sufficient to contaminate the germanium to such a level as to produce undesirably long time-constants. These acceptor impurities can be compensated to reduce the time-constant, but then the impedance increases to an unacceptable level and detectivity falls off sharply.

I have also discovered that photoconductive infrared detector material having an acceptably short time-constant at temperatures in the 27°–32° K range can be produced without loss of any other necessary or desired characteristics by starting with chemically-refined germanium, further refining the germanium by a number of molten zone-refining passes to reduce the impurities which act as shallow acceptors to a level on the order of $10^{12}$ atoms/cm$^3$ or less, compensating the remaining shallow acceptors with shallow donors such as antimony or arsenic, and then doping the germanium with mercury from the vapor state using steps to insure that the germanium is not again contaminated by copper or the other shallow acceptor impurities.

The resulting semiconductor material is a single crystal of substantially pure germanium doped with mercury to a level on the order of from $1\times10^{14}$ to $3\times10^{15}$ and having on the order of or less than $10^{12}$ atoms/cm$^3$ of shallow acceptors such as copper and Group III elements which have been compensated by antimony or arsenic to a level on the order of $10^{13}$ atoms/cm$^3$.

More specifically, the process of the present invention entails further refining a chemically-refined germanium bar by passing a molten zone along the bar a plurality of times in the same direction while maintaining a single crystal to reduce the copper and other shallow acceptor impurities as much as practical by this process; adding a compensating shallow donor, such as antimony or arsenic, to the crystal during the last zone-refining pass to compensate the remaining copper; thoroughly cleaning the surface of the germanium bar by etching the surface of the bar; placing the bar and a single crystal mercury-doped germanium seed in a sandblasted synthetic quartz boat, the surface of which has been etched, leached and thoroughly rinsed to remove any copper which may have contaminated the surface of the boat during or after its manufacture; placing the boat in a quartz bomb-tube, the interior surface of which has been similarly etched, leached and rinsed to remove any copper embedded in the surface thereof; placing substantially pure mercury in the bomb-tube in an excess quantity sufficient to fill the bomb-tube with vapor and still maintain a condensed pool of mercury; drawing a vacuum on the bomb-tube and sealing the tube; heating the tube to a temperature less than the melting point of the germanium to vaporize the mercury and establish a mercury vapor pressure within the bomb; and passing a molten zone from the seed through the bar to produce a single crystal germanium bar doped with mercury to a level determined by the mercury vapor pressure within the bomb.

Therefore, an important object of the present invention is to provide mercury-doped germanium suitable for use as a photoconductive infrared detector at temperatures obtainable by liquid neon.

Another object of this invention is to provide a mercury-doped germanium infrared detector having a time-constant less than one micro-second at temperatures at least as high as 32° K.

Still another important object of the present invention is to provide a process for manufacturing mercury-doped germanium of the type described.

Additional objects and advantages of the present invention will be evident to those skilled in the art from the following detailed description and drawing, wherein:

The FIGURE is a schematic diagram of a horizontal zone-refining apparatus which may be used to carry out the process of the present invention.

Referring now to the drawing, a standard horizontal zone-refining apparatus of the type using a sealed bomb-tube is indicated generally by the reference numeral 10. The apparatus 10 comprises a stationary quartz support tube 12 which is sized to receive a sealed quartz bomb-tube 14 in which is located a quartz boat 16, both of which will hereafter be described in greater detail. A suitable temperature-sensing means 18, such as a thermocouple, is attached to one end of the bomb-tube 14 and is connected by electrical leads 20 to a suitable temperature indicator 22. Three resistive heating coils 24, 26 and 28 are disposed around the support tube 12. The coils 24, 26 and 28 may be well-insulated resistive wire heaters. Alloy K wire is suitable for this purpose. The outer coils 24 and 28 are used to maintain the bomb-tube 14 at a temperature below the melting point of germanium. The center heater 26 is used to establish a molten zone in a germanium bar. The coils are supported by a gear-driven platform 30, which may be propelled at a very slow rate along the support tube 12 so that the molten zone established by the center heating coil 26 may be passed through the germanium bar disposed in the boat 16 for purposes which will hereafter be described in detail.

The starting material for the process of the present invention is a high quality, chemically-refined germanium. The chemically-refined germanium is further refined by passing a molten zone from one end of the bar to the other a number of times. Any suitable zone-refining apparatus may be used for this purpose. A single crystal seed is used at the start of the first zone-refining pass to establish a single crystal and the single crystal is maintained during all subsequent passes. The molten zone is preferably passed through the germanium bar from five to 10 times. During these passes, all significant impurities will be removed from the germanium except very small amounts of copper which act as shallow acceptors at the 0.04 eV level and some much smaller amounts of shallow acceptors from Group III. These impurities cannot be materially reduced by further zone-refining or by any other feasible process, and will be on the order of, or less than, $10^{12}$ atoms/cm³.

The copper is then precisely compensated by adding the necessary quantity of a shallow donor impurity, either antimony or arsenic to the molten zone of the germanium bar during the last zone-refining pass. It has been found that 19 milligrams of 0.5 percent antimony-doping compound added to a 22 cc molten zone results in the proper level of antimony, on the order of $10^{13}$ atoms/cm³, to compensate for the remaining copper. After the germanium has been zone-refined to reduce the amount of copper impurities in the germanium to a minimum and then the copper impurities compensated with antimony, the germanium crystal should have electrical data within the approximate ranges set forth in Table I below.

TABLE I

Electrical Data at 300° K $\rho$ $3 \times 10^1 - 4 \times 10^1$ OHM-CM
$\mu$ $1.5 \times 10^3 - 2.5 \times 10^3$ CM²/VOLT-SEC.
N $7 \times 10^{13} - 1 \times 10^{14}$ ATOMS/CM³

Electrical Data at 77° K $\rho$ $5 \times 10^0 - 7 \times 10^0$ OHM-CM
$\mu$ $2 \times 10^4 - 3.8 \times 10^4$ CM/VOLT-SEC.
N $3 \times 10^{13} - 8 \times 10^{13}$ ATOMS/CM³

A bar of the zone-refined and compensated germanium crystal is then cut with a diamond saw to a size which can be placed in the boat 16 with a seed in place. A suitable single crystal seed is preferably obtained from a mercury-doped germanium crystal which has previously been manufactured in accordance with the process of the present invention and which has been tested as a photoconductive infrared detector and has been found to have an acceptably short time-constant. When such a seed is not available, a single crystal seed of the highest purity mercury-doped or undoped germanium available may be used on any orientation except [111].

The mercury-doped germanium seed and compensated germanium bar are degreased with trichloroethylene followed by a methyl alcohol rinse, then etched in CP–4 solution for 20–30 seconds. The CP–4 solution is a mixture comprised of 25 percent acetic acid, 25 percent hydrofluoric acid, and 50 percent a solution of nitric acid and bromine. The nitric acid-bromine solution is comprised of about 10–15 drops of bromine in 250 cc. of nitric acid and should not be mixed with the acetic and hydrofluoric acids until just before the CP–4 is to be used. The CP–4 solution etches away the surface layer of the seed and germanium bar and thereby insures that any copper which may have contaminated the surface of the materials as the crystals were cut to the desired shape to be removed. The bar and seed are then rinsed in 16 meg-ohm or better water. Next, the germanium seed crystal and germanium bar are soaked in a 50 percent solution of hydrochloric acid and water for about 10 minutes to further remove any copper which may have been left by the CP–4 solution on the surface of the crystals, then rinsed with 16 meg-ohm or better water and allowed to dry between two sheets of bibulous paper.

The composition of the bomb-tube 14 and boat 16 and the preparation of these parts of the process apparatus is very important because each must be a high purity material free from the customary traces of copper which can be found in almost all manufactured products as a result of diffusion from extrusion dies and other manufacturing equipment. The bomb-tube 14 may be a standard G.E. clear fused quartz bomb-tube having a 22 mm ID with walls 2 mm thick. These bomb-tubes are 20 inches long and domed off at one end prior to being loaded and sealed off under vacuum as will presently be described. The boat 16 should be a clear fused synthetic quartz boat. An example of a suitable boat is one sold by Thermal American Quartz Company of Montville, New Jersey, under the trademark "Spectrosil," or an equivalent. These boats are manufactured in such a manner as to exclude detectable traces of copper and these boats have been successfully used to carry out the process of the present invention.

The inside surface of the boat 16 is sandblasted to prevent wetting by molten germanium so that a single crystal can be formed as the molten zone is passed through the bar. The boat 16 and the bomb-tube 14 are thoroughly degreased with trichloroethylene followed by a methyl alcohol rinse. Then the boat and bomb-tube are soaked in full strength hydrofluoric acid for 10 minutes to etch away the surface layer of the quartz material and remove any traces of copper which may have wiped off on the parts during manufacturing, handling, or shipping, then rinsed in water having 16 meg-ohm resistance or better. Next the bomb-tube and boat are soaked in strong sodium hydroxide solution for 30 minutes to leach the surface of the parts and further remove any copper impurities adjacent the surface of the parts, then again rinsed in 16 meg-ohm or better water. Next the bomb-tube and boat are soaked in full strength hydrochloric acid for 30 minutes to further insure that all residual sodium hydroxide and copper solution is removed, and again rinsed in water having 16 meg-ohm resistance or better. The boat is then allowed to dry between two sheets of bibulous paper. The bomb-tube is hung with the open end down and excess water drained from within the tube. No further drying of the tube is necessary or should be attempted because to do so would likely result in contamination of the interior of the bomb-tube.

The compensated germanium bar 32, the single crystal seed 34, and about 2 grams of mercury 36 are placed in the boat 16 in the general positions indicated in the drawing. Only very high purity mercury should be used. New, triple-distilled mercury has been successfully used. The precise amount of mercury added to the bomb-tube is unimportant so long as an excess is available at the operating cold spot temperature of the bomb, as will be presently defined, to form a condensed pool after the bomb-tube is filled with mercury vapor. The bomb-tube 14 is then positioned horizontally and the boat 16 inserted with the seed 34 next to the back end of the bomb-tube. The open end of the bomb-tube 14 is then connected to a vacuum system and a vacuum pulled on the tube. A good mechanical vacuum pump with a cold trap is sufficient since the primary purpose is to reduce the pressure within the tube and remove substantially all of the volatile impurities, including the water, from within the bomb-tube. For example, a vacuum of about 1 micron of mercury has been found adequate. The bomb-tube is then sealed by heating the bomb-tube adjacent the open end and constricting the heated portion until a seal is accomplished. The vacuum should be maintained as the bomb-tube is sealed so that any impurities volatilized as a result of heating the bomb-tube will be withdrawn from the tube. The vacuum will also assist in collapsing and sealing the tube. The thermocouple 18 or other heat-sensing device is then placed against the end of the bomb-tube 14 and the bomb-tube inserted in the support tube 12 of the horizontal zone-refining apparatus 10.

The resistive heaters 24, 26 and 28 are then energized. The heater 28 is adjusted until the end of the bomb-tube 14 is at a temperature in excess of 500° C., but less than the melting point of the germanium, so that the temperature adjacent the thermocouple 18 will be the coldest spot on the bomb-tube 14, and will therefore control the vapor pressure of the mercury. As the bomb-tube is heated, the mercury in the boat 16 vaporizes and recondenses as a pool at the cold spot adjacent the thermocouple 18. A sufficient volume of mercury must be placed within the bomb-tube to always maintain a pool of condensed mercury at the cold spot. Unless a small pool of condensed mercury is visible on the end of the bomb-tube adjacent the thermocouple 18, either an insufficient quantity of mercury is present within the bomb-tube, or the bomb-tube 14 has another point which is at a lower temperature. The temperature of the pool of condensed mercury determines the vapor pressure of the mercury within the bomb-tube, which in turn determines the doping level of the mercury in the germanium. Therefore, it is very important that the point adjacent the thermocouple 18 be the coldest point of the bomb-tube and be maintained at the predetermined temperature which will produce the desired doping level. As will hereafter be pointed out in greater detail, the proper temperature can be determined empirically after a few runs.

The center heater 26 should be adjusted until the temperature of the germanium bar 32 adjacent the germanium seed crystal 34 exceeds 1,000° C. so as to produce a molten zone between the seed and the bar. The extent to which the temperature exceeds the melting point will determine the width of the molten zone. After a molten zone has been established, the mercury vapor within the bomb-tube 14 will diffuse into the molten zone until an equilibrium concentration of mercury is established in the germanium, which will determine the ultimate concentration of mercury in the final germanium crystal. Since the equilibrium concentration is a function of the vapor pressure of the mercury and therefore is directly related to the temperature of the cold spot on the bomb-tube adjacent the thermocouple 18, the temperature of the cold spot determines the doping level. The molten zone is then carried through the length of the germanium bar 32 by moving the platform 30 and heaters 24, 26 and 28 relative to the bomb-tube and boat. Care should be taken to maintain the temperature of the cold spot on the bomb-tube 14 at predetermined level in order to maintain the vapor pressure of the mercury constant and thereby obtain a constant mercury doping level over the length of the germanium bar. After the molten zone has been carried through the germanium bar, the three heating elements 24, 26 and 28 are turned "off" and the bomb-tube 14 and the boat 16 should be allowed to cool under the heaters to prevent thermal fracture of the germanium crystal.

Mercury concentrations as high as about $2 \times 10^{15}$ atoms/cm$^3$ have been obtained using the described process with a cold spot temperature of about 500° C., which results in a mercury vapor pressure of about nine atmospheres. Equipment which will handle higher pressures could be expected to yield higher mercury levels. By way of example, when undoped, zone-refined, antimony-compensated germanium having the electrical data set forth in Table II was doped with mercury using the process described above, mercury-doped germanium infrared detector material having the electrical characteristics set forth in Table III and a time-constant less than one micro-second at liquid neon temperature was obtained without loss of other desirable characteristics.

TABLE II

Electrical Data on Germanium

| | 300° K | 77° K |
|---|---|---|
| $\rho$ | $4.08 \times 10^{1}$ ohm-cm | $6.70 \times 10^{0}$ ohm-cm |
| $\mu$ | $2.04 \times 10^{3}$ cm$^2$ /volt-sec | $2.28 \times 10^{4}$ cm$^2$/volt-sec |
| N | $7.52 \times 10^{13}$ atoms/cm$^3$ | $4.08 \times 10^{13}$ atoms/cm$^3$ |

TABLE III

Electrical Data on Mercury-doped Germanium

| | 300° K | 77° K |
|---|---|---|
| $\rho$ | $1.02 \times 10^{0}$ ohm-cm | $3.61 \times 10^{0}$ ohm-cm |
| $\mu$ | $2.93 \times 10^{3}$ cm$^2$/volt-sec | $3.63 \times 10^{4}$ cm$^2$/volt-sec |
| P | $2.09 \times 10^{15}$ atoms/cm$^3$ | $4.77 \times 10^{13}$ atoms/cm$^3$ |

After the photoconductive detector material is molten zone-refined as described, the shallow acceptor impurities will be almost entirely copper and will be at a level less than about $1 \times 10^{13}$ atoms/cm$^3$. If properly carried out, the copper can be reduced as low as $1 \times 10^{12}$ atoms/cm$^3$, and the lower the copper level is reduced, the better the material will be suited for use as a photoconductive infrared detector. The copper and other shallow acceptor impurities should be compensated only to the extent required to insure that the compensating donor impurities will remain dominant over the acceptor impurities. This requires that the level of compensating donor impurities exceed the level of acceptor impurities by about one order of magnitude. However, the donor impurities must not approach the level of the mercury dopant and should be less than about $1 \times 10^{14}$ atoms/cm$^3$.

Although the invention has been described in terms of a specific embodiment, it is to be understood that various changes, substitutions and alterations can be made therein without departing from the spirit and scope of the invention as defined by the appended claims.

What is claimed is:

1. A semiconductor material suitable for use as a photoconductive infrared detector at liquid neon temperatures consisting of:
   a single crystal of germanium having less than $10^{13}$ atoms/cm$^3$ of copper and Group III shallow acceptor impurities compensated with arsenic at a level one order of magnitude greater than the level of said shallow acceptor impurities and doped with mercury to a level in excess of $10^{14}$ atoms/cm$^3$.
2. A semiconductor material suitable for use as a photoconductive infrared detector at liquid neon temperatures consisting of:
   a single crystal of germanium having less than $10^{13}$ atoms/cm$^3$ of copper and Group III shallow acceptor impurities compensated with antimony at a level one order of magnitude greater than the level of said shallow acceptor impurities and doped with mercury to a level in excess of $10^{14}$ atoms/cm$^3$.
3. A semiconductor material suitable for use as a photoconductive infrared detector at liquid neon temperatures consisting of:
   a single crystal of germanium having less than $10^{13}$ atoms/cm$^3$ of copper compensated with arsenic at a level one order of magnitude greater than the level of copper and doped with mercury to a level in excess of $10^{14}$ atoms/cm$^3$.
4. A semiconductor material suitable for use as a photoconductive infrared detector at liquid neon temperatures consisting of:
   a single crystal of germanium having less than $10^{13}$ atoms/cm$^3$ of copper compensated with antimony at a level one order of magnitude greater than the level of copper and doped with mercury to a level in excess of $10^{14}$ atoms/cm$^3$.
5. A semiconductor material suitable for use as a photoconductive infrared detector at liquid neon temperatures consisting essentially of:
   a single crystal of germanium having less than $10^{13}$ atoms/cm$^3$ of copper and Group III shallow acceptor impurities compensated with arsenic at a level about one order of magnitude greater than the level of said shallow acceptor impurities and doped with mercury to a level in excess of $10^{14}$ atoms/cm$^3$, said mercury atoms being present to a level in excess of said arsenic atoms.
6. A semiconductor material suitable for use as a photoconductive infrared detector at liquid neon temperatures consisting essentially of:
   a single crystal of germanium having less than $10^{13}$ atoms/cm$^3$ of copper and Group III shallow acceptor impurities compensated with antimony at a level about one order of magnitude greater than the level of said shallow acceptor impurities and doped with mercury to a level in excess of $10^{14}$ atoms/cm$^3$, said mercury atoms being present to a level in excess of said antimony atoms.
7. A semiconductor material suitable for use as a photoconductive infrared detector at liquid neon temperatures consisting essentially of:

a single crystal of germanium having less than $10^{13}$ atoms/cm$^3$ of copper compensated with arsenic at a level about one order of magnitude greater than the level of copper and doped with mercury to a level in excess of $10^{14}$ atoms/cm$^3$, said mercury atoms being present to a level in excess of said arsenic atoms.

8. A semiconductor material suitable for use as a photoconductive infrared detector at liquid neon temperatures consisting essentially of:

a single crystal of germanium having less than $10^{13}$ atoms/cm$^3$ of copper compensated with antimony at a level about one order of magnitude greater than the level of copper and doped with mercury to a level in excess of $10^{14}$ atoms/cm$^3$, said mercury atoms being present to a level in excess of said antimony atoms.

9. In a semiconductor material of the class wherein a single crystal of germanium is purified to have less than $1 \times 10^{13}$ atoms/cm$^3$ of copper and Group III shallow acceptor impurities, the combination with said crystal of elemental arsenic to a level of one order of magnitude greater than the level of shallow acceptor impurities and of elemental mercury to a level in excess of $1 \times 10^{14}$ atoms/cm$^3$, said mercury atoms being present to a level in excess of said arsenic atoms, thereby making said semiconductor material suitable for use as a photoconductive infrared detector at liquid neon temperatures.

10. In a semiconductor material of the class wherein a single crystal of germanium is purified to have less than $1 \times 10^{13}$ atoms/cm$^3$ of copper and Group III shallow acceptor impurities, the combination with said crystal of elemental antimony to a level of one order of magnitude greater than the level of shallow acceptor impurities and of elemental mercury to a level in excess of $1 \times 10^{14}$ atoms/cm$^3$, said mercury atoms being present to a level in excess of said antimony atoms, thereby making said semiconductor material suitable for use as a photoconductive infrared detector at liquid neon temperatures.

11. A photoconductive infrared detector for operation at liquid neon temperatures comprising a semiconductor material consisting essentially of a single crystal of germanium having less than a total of $10^{13}$ atoms/cm$^3$ of copper and Group III shallow acceptor impurities, said copper and Group III shallow acceptor impurities being compensated with antimony at a level of about one order of magnitude greater than the level of said shallow acceptor impurities, and said single crystal of germanium being doped with mercury to a level in excess of $10^{14}$ atoms/cm$^3$, said mercury atoms being present to a level in excess of said antimony atoms.

12. A photoconductive infrared detector for operation at liquid neon temperatures comprising a semiconductor material consisting essentially of a single crystal of germanium having less than a total of $10^{13}$ atoms/cm$^3$ of copper and Group III shallow acceptor impurities, said copper and Group III shallow acceptor impurities being compensated with arsenic at a level of about one order of magnitude greater than the level of said shallow acceptor impurities, and said single crystal of germanium being doped with mercury to a level of excess of $10^{14}$ atoms/cm$^3$, said mercury atoms being present to a level in excess of said arsenic atoms.

13. A photoconductive infrared detector for operation at liquid neon temperatures comprising a semiconductor material consisting essentially of a single crystal of germanium having less than a total of $10^{13}$ atoms/cm$^3$ of copper compensated with antimony at a level of about one order of magnitude greater than the level of said copper atoms, and said single crystal of germanium being doped with mercury to a level to an excess of $10^{14}$ atoms/cm$^3$, said mercury atoms being present to a level in excess of said antimony atoms.

14. A photoconductive infrared detector for operation at liquid neon temperatures comprising a semiconductor material consisting essentially of a single crystal of germanium having less than a total of $10^{13}$ atoms/cm$^3$ of copper compensated with arsenic at a level of about one order of magnitude greater than the level of said copper atoms, and said single crystal of germanium being doped with mercury to a level in excess of $10^{14}$ atoms/cm$^3$, said mercury atoms being present to a level in excess of said arsenic atoms.

* * * * *